(12) United States Patent
Decoodt

(10) Patent No.: US 9,314,786 B2
(45) Date of Patent: Apr. 19, 2016

(54) REACTOR FOR CONTINUOUS CATALYST REGENERATION WITH A PERFORATED BOX FOR MIXING AND DISTRIBUTING GASES IN THE OXYCHLORINATION ZONE

(71) Applicant: AXENS, Rueil Malmaison Cedex (FR)

(72) Inventor: Xavier Decoodt, Carrieres S/Seine (FR)

(73) Assignee: AXENS, Rueil Malmaison (FR)

( * ) Notice: Subject to any disclaimer, the term of this patent is extended or adjusted under 35 U.S.C. 154(b) by 337 days.

(21) Appl. No.: 13/950,566

(22) Filed: Jul. 25, 2013

(65) Prior Publication Data
US 2014/0027349 A1    Jan. 30, 2014

(30) Foreign Application Priority Data

Jul. 25, 2012 (FR) ..................... 12/02107

(51) Int. Cl.
| | |
|---|---|
| *B01J 23/96* | (2006.01) |
| *B01J 38/44* | (2006.01) |
| *B01J 38/12* | (2006.01) |
| *C10G 35/12* | (2006.01) |
| *B01J 8/12* | (2006.01) |
| *B01J 23/42* | (2006.01) |
| *B01J 8/08* | (2006.01) |

(52) U.S. Cl.
CPC ........ *B01J 38/44* (2013.01); *B01J 8/085* (2013.01); *B01J 8/125* (2013.01); *B01J 23/42* (2013.01); *B01J 23/96* (2013.01); *C10G 35/12* (2013.01); *B01J 2219/00024* (2013.01); *Y10T 29/4973* (2015.01)

(58) Field of Classification Search
CPC .. B01J 2219/00024; B01J 23/96; B01J 38/44; B01J 38/04; B01J 38/12; B01J 8/085; B01J 8/125; C10G 2400/02; C10G 35/085; C10G 35/12
See application file for complete search history.

(56) References Cited

U.S. PATENT DOCUMENTS

| | | | |
|---|---|---|---|
| 3,132,092 | A | 5/1964 | Vaell et al. |
| 6,103,652 | A | 8/2000 | Brunet et al. |
| 7,985,381 | B2 | 7/2011 | Sun et al. |

FOREIGN PATENT DOCUMENTS

EP    0 872 277    10/1998

OTHER PUBLICATIONS

Search Report for FR1202107 dated Mar. 8, 2013.

*Primary Examiner* — Renee E Robinson
*Assistant Examiner* — Derek Mueller
(74) *Attorney, Agent, or Firm* — Millen, White, Zelano and Branigan, P.C.

(57) ABSTRACT

A reactor allowing continuous regeneration of catalyst grains having a chamber with an oxychlorination zone superposed on a calcination zone equipped with a pipe for introducing calcination gas and at least one pipe for injecting oxychlorination gas emptying into the inner space. Each gas passage has a gas evacuation device that is permeable to gas and impermeable to catalyst grains.

10 Claims, 2 Drawing Sheets

REACTOR FOR CONTINUOUS CATALYST REGENERATION WITH A PERFORATED BOX FOR MIXING AND DISTRIBUTING GASES IN THE OXYCHLORINATION ZONE

This invention relates to the field of the conversion of hydrocarbons and more specifically of the reforming of hydrocarbon-containing feedstocks in the presence of a moving-bed catalyst for producing gasoline fractions. This invention proposes a catalyst regeneration reactor with a box making it possible to mix the calcination gas and the oxychlorination gas and to distribute the gas that results in the oxychlorination zone of the catalyst.

The processes for catalytic reforming of gasolines operating in a moving bed generally implement a reaction zone that can comprise three or four reactors in a series and a catalyst regeneration zone that implements a certain number of stages, in general a combustion stage, and an oxychlorination stage, followed by a calcination stage and a reduction stage. The document U.S. Pat. No. 3,761,390 describes a sample embodiment of a catalytic reforming process operating in a moving bed.

The document U.S. Pat. No. 7,985,381 describes in detail a regeneration reactor that comprises a combustion zone, an oxychlorination zone, and a calcination zone. The catalyst circulates in a downward vertical direction in the reactor. It passes from the oxychlorination zone to the calcination zone via an annular ring. A calcination gas that is injected at the bottom of the calcination zone passes through, in countercurrent, the catalyst bed into the calcination zone and then is recovered in a second annular zone located on the periphery of the reactor. In this second annular zone, the oxychlorination gas is injected to be mixed with the calcination gas that has been recovered. The gas mixture is then injected on the periphery of the reactor at the bottom of the oxychlorination zone.

The injection of this gas mixture on the periphery of the reactor has the drawback of generating a speed profile of the non-homogeneous gas at the outlet of the injection zone on the cross-section of the oxychlorination zone. In addition, the passage of the catalyst from the oxychlorination zone to the calcination zone via an annular ring is cumbersome in the reactor and generates pressure drops. Nevertheless, the pressure drops are not sufficient to prevent calcination gas from rising directly via the downward legs of the catalyst without passing into the external annular ring and therefore without being mixed with the calcination gas.

This invention proposes to optimize the distribution of the gas mixture that is injected into the oxychlorination zone by means of a perforated box that makes it possible in particular to optimize the mixing of gas and to distribute the gas mixture in a homogeneous manner over the cross-section of the reactor.

In a general manner, this invention relates to a reactor for continuous regeneration of catalyst grains that is composed of a chamber that comprises an oxychlorination zone superposed on a calcination zone that is equipped with a pipe for introducing calcination gas, characterized in that a box is placed between the oxychlorination zone and the calcination zone, with the box consisting of an inner space that is located between an upper tray and a lower tray, with the upper tray being gas-tight and sealed against catalyst grains, and with the lower tray being provided with openings, the box being separated by a height H from the calcination zone by a mixing zone that extends over said height H, a number of tubes passing through the box, allowing the catalyst grain to pass from the oxychlorination zone into the calcination zone, with the tubes extending over the height H of the mixing zone, a number of gas passage means passing through the box from the mixing zone to the oxychlorination zone, the reactor comprising at least one pipe for injecting oxychlorination gas emptying into the inner space, each gas passage means comprising a gas evacuation means in the oxychlorination zone, with the gas evacuation means being permeable to gas and impermeable to catalyst grains.

According to the invention, each gas evacuation means can be selected from among a bubble cap, a perforated plate, or a grid.

For example, each gas evacuation means is composed of a vertical tubular grid, with the lower end of the tubular grid communicating with the mixing zone, and the upper end of the grid being blocked by a roof. The roof can be a cone whose peak is directed upward.

The pipe for injecting oxychlorination gas can empty into the middle of the inner space of the box. Alternatively, the pipe for injecting oxychlorination gas can empty into the inner space of the box at the wall of the chamber of the reactor.

At least one portion of the tubes and gas passage means can be integral with the two trays.

The invention also relates to the use of the reactor according to the invention in a process for catalytic reforming of a hydrocarbon feedstock, in which A stream of catalyst grains is introduced at the top of the oxychlorination zone, A stream of calcination gas is introduced via the pipe for introducing calcination gas, A stream of oxychlorination gas is introduced via the pipe for injecting oxychlorination gas, A stream of gas is evacuated at the top of the oxychlorination zone, A stream of catalyst grains is evacuated at the bottom of the calcination zone.

The catalyst grains can comprise platinum deposited on a porous substrate, the stream of calcination gas can comprise air or depleted air and can be at a temperature of between 400° C. and 550° C., and the stream of oxychlorination gas can comprise a chlorinated compound and can be at a temperature of between 350° C. and 550° C.

According to the invention, it is possible to carry out a remodeling of a reactor that exists by replacing the old oxychlorination gas injection system by said mixing zone.

According to the invention, the fact of mixing the calcination gas with the oxychlorination gas in a zone that is lacking in catalyst grain makes it possible to obtain a good gas mixture.

In addition, the multiplication of the gas injection points on the cross-section of the reactor makes possible an excellent distribution of the gas mixture over the entire cross-section of the reactor, starting from the outlet of the box.

In addition, the box that is used according to the invention offers the advantage of being compact and of ensuring an excellent mechanical strength because of its structure.

Furthermore, the passage of catalyst grains from the oxychlorination zone to the calcination zone via tubes makes it possible to minimize the passage of gas directly from the calcination zone to the oxychlorination zone without passing through the mixing zone because of the small potential cross-section of passage for the gas.

In addition, this invention can be easily implemented in existing installations. In particular, this invention can advantageously replace an oxychlorination gas injection device so as to improve its mixing and distribution performances.

BRIEF DESCRIPTION OF DRAWINGS

Other characteristics and advantages of the invention will be better understood and will appear clearly from reading the description given below by referring to the drawings, among which:

In FIG. 1, the catalyst regeneration reactor consists of a chamber 2 that contains a combustion zone CO, an oxychlorination zone O, and a calcination zone CA. The chamber 2 can be in the form of a vertical axis cylinder, with the cylinder being closed at its ends. The zones for combustion, oxychlorination, and calcination are superposed in the reactor 1. In the reactor 1, these zones can have the same diameter or different diameters.

Figure 1:
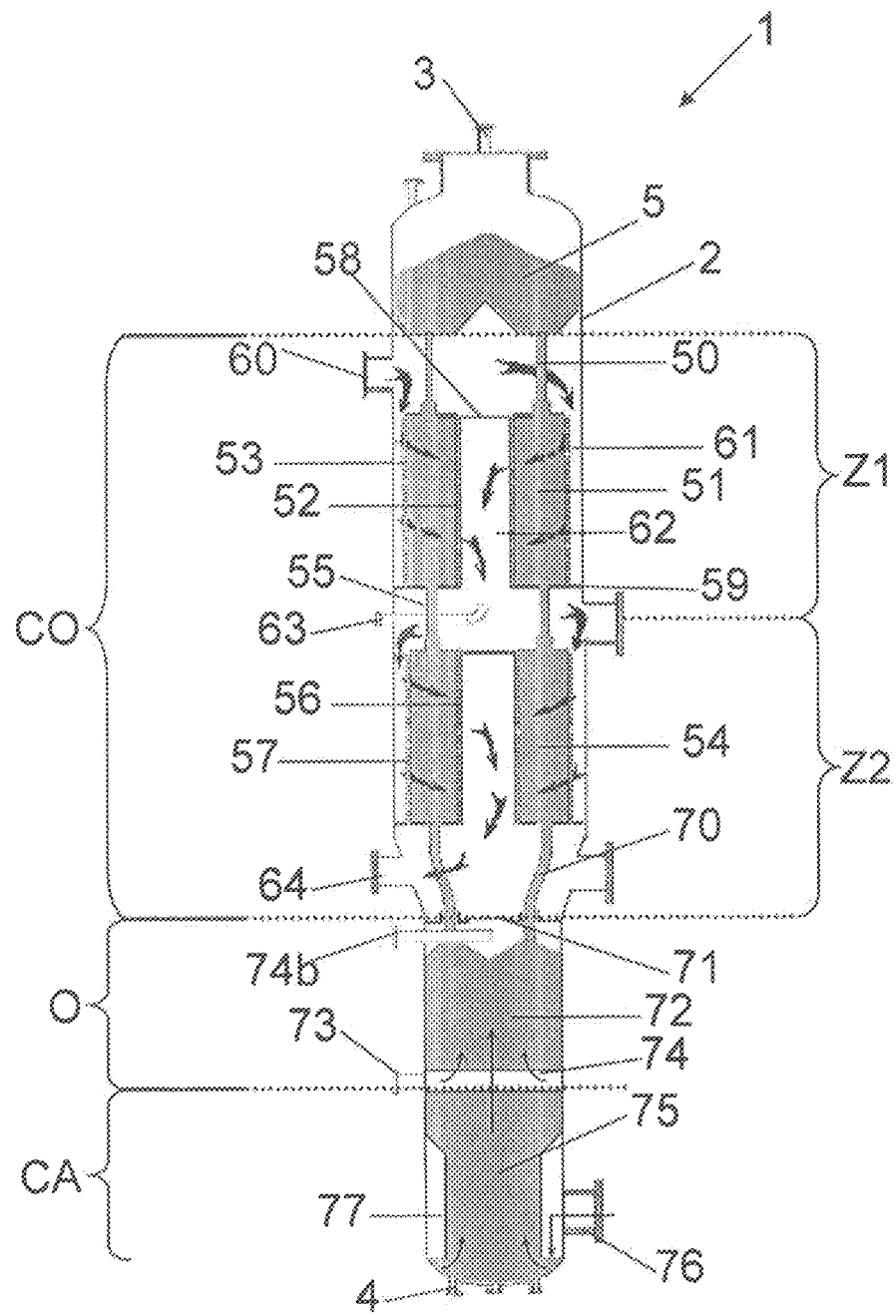
FIG. 1 shows a catalyst regeneration reactor.

The catalyst that is to be regenerated is introduced at the top of the reactor 1 by the pipe(s) 3 and is evacuated from the reactor 1 via the pipes 4 that are located at the bottom of the reactor 1. Under the effect of gravity, the catalyst circulates from top to bottom in the reactor by successively passing through the zones for combustion CO, oxychlorination O, and calcination CA. The catalyst is evacuated from the reactor 1 at the bottom of the calcination zone CA via the pipes 4. The reactor 1 is continuously supplied with catalyst, and the catalyst circulates continuously in the reactor 1.

The catalyst is in the form of solid grain, for example in ball form having between 0.5 and 20 mm in diameter so as to facilitate the circulation of the catalyst in the reactor 1. The catalyst grains consist of a porous substrate, for example an alumina, on which different compounds—in particular platinum and chlorine, and optionally tin, rhenium, indium and/or phosphorus—have been deposited. The catalyst that is to be regenerated comprises coke, for example approximately 5% by weight of coke.

The catalyst that is introduced by the pipe 3 into the reactor 1 arrives in a tank 5 that is equipped with a hopper that makes it possible to supply the combustion zone CO with catalyst.

The combustion zone CO has as its object to carry out the combustion of the coke deposited on the catalyst. The zone CO can comprise one or more stages. The reactor 1 of FIG. 1 comprises two stages Z1 and Z2. According to a particular embodiment, the combustion zone can also comprise a combustion monitoring zone, for example as described by the document FR 2761907. The catalyst of the tank 5 is introduced into an annular space 51 of the stage Z1 via the feed pipes 50. The annular space 51 is delimited by two tubular grids 52 and 53, for example cylindrical and concentric. The space 61 that is located between the tubular grid 53 and the chamber 2 is blocked at its lower end by the plate 59. The space 61 can be arranged in the form of a portion commonly named "scallops." The central space 62 that is located inside the tubular grid 52 is blocked at its upper end by the plate 58. The catalyst of the annular space 51 is introduced into an annular space 54 of the stage Z2 via the feed pipes 55. The space 54 is delimited by two tubular grids 56 and 57, for example cylindrical and concentric. The grids 52, 53, 56 and 57 make it possible to retain the catalyst while allowing gas to pass. For example, the grids 52, 53, 56 and 57 can be Johnson grids and/or perforated plates.

A first stream of combustion gas containing oxygen is introduced into the chamber 2 at the top of the stage Z1 by the opening 60. In the stage Z1, the stream of gas circulates according to the arrows that are indicated in FIG. 1 by passing through the catalyst bed contained in the annular space 51. Actually, the airtight plates 58 and 59 force the combustion gas coming in via the opening 60 to pass from the space 61 onto the periphery of the annular space 51 to the central space 62 located inside the grid 52 by passing through the catalyst into the annular space 51. A second stream of combustion gas containing oxygen is introduced between stages Z1 and Z2 via the pipe 63. This second stream mixes with the first gas stream that has passed through stage Z1. In the same way as for stage Z2, the combustion gas passes through the catalyst bed contained in the annular space 54 according to the arrows that are indicated in FIG. 1. After having passed through the catalyst of zone 54, the combustion gas is evacuated from stage Z2 via the pipe 64.

According to another embodiment, the combustion zone CO can be arranged in such a way that the combustion gas circulates from the inside to the outside in the annular spaces 51 and 54. In addition, alternatively, according to another embodiment, the combustion zone can be arranged in such a way that the movement of the gas is injected at the bottom of the zone CO and is evacuated at the top of the zone CO.

The catalyst in the annular zone 54 of the combustion zone flows from the combustion zone CO into the oxychlorination zone O via the pipes 70. The plate 71 that is placed between the combustion zone and the oxychlorination zone O is gas-tight to prevent the circulation of gas between these two zones.

In particular, the oxychlorination zone O has as its object to recharge the catalyst grains with chlorine and to redisperse the platinum on its surface so as to improve the distribution of the platinum in the catalyst grains. In the oxychlorination zone O, the catalyst flows into the space 72 inside the reactor, for example the cylindrical space defined by the walls of the chamber 2 of the reactor. The bottom of the space 72 of the oxychlorination zone O is equipped with the pipe 73 that makes it possible to inject the oxychlorination gas into the oxychlorination zone. The oxychlorination gas comprises a chlorine-containing compound and can be at a temperature of between 350° C. and 550° C., preferably between 460° C. and 530° C. At the top of the space 72, the pipe 74b makes it possible to evacuate gas from the oxychlorination zone O. The oxychlorination gas that is injected via the pipe 73 circulates in an upward direction through the space 72, in countercurrent to the gravity flow of the catalyst. Then, the gas that has passed through the space 72 is evacuated from the chamber 2 via the pipe 74b.

The catalyst that comes in at the bottom of the oxychlorination zone O continues to flow from the space 72 to the space 75 of the calcination zone CA. The calcination zone in particular has as its object to dry the catalyst grains. The bottom of the calcination zone CA is equipped with the pipe 76 that makes it possible to inject the calcination gas at the bottom of the space 75. The calcination gas comprises air or oxygen-depleted air and can be at a temperature of between 400° C. and 550° C. So as to distribute in a homogeneous manner the calcination gas in the space 75, the pipe 76 can empty into an annular space 77 that is arranged on the periphery, between the space 75 and the chamber 2. The annular space 77 is open in its lower part located at the bottom of the space 75 of the calcination zone CA. Thus, the gas that is injected via the pipe 76 is distributed in the catalyst bed over the entire periphery at the bottom of the space 75. The calcination gas that is injected via the pipe 76 circulates in an upward direction, in countercurrent to the gravity flow of the catalyst, through the space 75, and then through the space 72. When the calcined gas passes from the space 75 to the space 72, it encounters—and mixes with—the oxychlorination gas that is injected via the pipe 73. Then, the gas that has passed through the space 72 is evacuated from the chamber 2 via the pipe 74b.

According to the invention, a mixing zone 74 is placed between the space 72 and the space 75. The mixing zone 74 comprises a box that is designed so as to carry out a homogeneous mixing of the calcination gas with the oxychlorination gas and to distribute in a homogeneous manner the gas mixture over the entire cross-section of the space 72.

The mixing zone 74 is described in detail with reference to FIG. 2. The references of FIG. 2 that are identical to those of FIG. 1 refer to the same elements.

Figure 2:
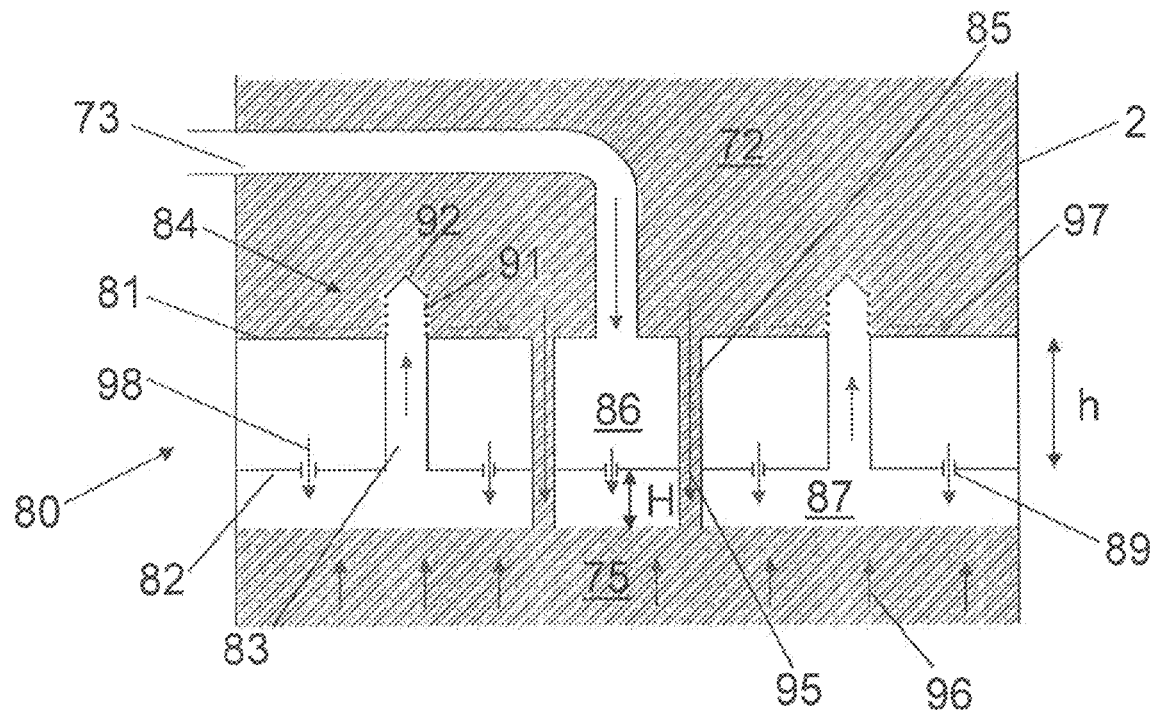
FIG. 2 shows an embodiment of the box according to the invention.

With reference to FIG. 2, the mixing zone consists of a box 80 that is positioned between the space 72 of the oxychlorination zone and the space 75 of the calcination zone. The box 80 extends over the entire cross-section of the chamber 2, along an essentially horizontal plane. The box 80 consists of two trays 81 and 82, which are preferably horizontal and which each extend over the cross-section of the chamber 2. The two trays are spaced by a height h for forming an inner space 86. The height h can vary between 50 mm and 500 mm. The tray 81 is a gas-tight plate and does not allow catalyst grains to pass. The tray 82 is a perforated tray, i.e., it is provided with openings 89 allowing gas to pass. For example, the trays 81 and 82 are each a disk with a cross-section that is equal to the inner cross-section of the chamber 2. The trays 81 and 82 can have different cross-sections. Alternatively, the tray 81 can be wavy, for example by forming cones or funnels around tubes 85 described below.

Several tubes 85, which make possible the flow of catalyst grains from the space 72 of the oxychlorination zone up to the space 75 of the calcination zone, pass through the box 80. The tubes 85 extend from the tray 81 to the tray 82 over the height h. The height h can vary between 50 mm and 500 mm, preferably between 100 mm and 400 mm.

The tubes 85 extend under the tray 82 over a height H. The tray 82 that is combined with the tubes 85 makes it possible to delimit a mixing space 87 located under the tray 82 between the tubes 85. The mixing space 87 extends over the height H of the tubes 85. The number, the position, the cross-section and/or the heights h and H of the tubes 85 are determined for ensuring the passage of the flow of catalyst from the space 72 to the space 75. For example, the cumulative cross-section of the tubes 85 is preferably greater than or equal to the cross-section of the pipes 4 for draining the catalyst at the bottom of the reactor 1, with the cross-sections being measured along a horizontal cutaway. The tubes 85 can be essentially vertical. For example, the axes of the tubes 85 form an angle of between 0° and 30° relative to the vertical direction. For example, the tubes 85 can be cylindrical tubes with a diameter that varies between 1" (25.4 mm) and 4" (101.6 mm) and cumulative heights h+H varying between 100 mm and 1,000 mm, preferably between 300 mm and 800 mm. The passage of the catalyst grains from the oxychlorination zone to the calcination zone via tubes 85, whose cumulative cross-section is relatively small, makes it possible to minimize the passage of gas directly through these tubes 85. The sizing parameters of the tubes 85 can, in addition, be determined for minimizing the amount of calcination gas rising from the space 75 to the space 72 through the tubes 85. To do this, the total number of tubes can be between 1 and 20, preferably between 4 and 20, and even preferably between 4 and 16, with the minimum diameter of the tubes being determined for preventing the blockage of catalyst grains in the tubes. Furthermore, the ratio between the cumulative cross-section of the tubes 85 and the surface of the tray 81 can be between 0.1 and 5%, preferably between 0.5 and 2%, with the cumulative cross-section and the surface of the tray 81 being measured along a horizontal plane.

In addition, gas passage means 83 pass through the box 80 in order to ensure the circulation of calcination gas from the space 75 of the calcination zone to the space 72 of the oxychlorination zone. The gas passage means 83 can consist of a number of tubes extending from the tray 82 to the tray 81 over the height h. The number, the position, the cross-section and/or the height h of the tubes 83 are determined for ensuring the passage of the flow of calcination gas from the space 75 to the space 72. The tubes 83 can be essentially vertical. For example, the axes of the tubes 83 form an angle of between 0° and 30° relative to the vertical direction. For example, the tubes 83 can be cylindrical tubes with a diameter that varies between 0.5" (12.7 mm) and 4" (101.6 mm) and with a height h that varies between 50 mm and 500 mm.

The mechanical strength of the tray 80 can be reinforced by making at least one portion of the tubes 85 and 83 integral with, on the one hand, the tray 81, and, on the other hand, the tray 82.

In their upper part, the gas passage means 83 comprise a gas evacuation means 84 for distributing gas into the space 72 of the oxychlorination zone. The openings are sized to allow gas to pass while preventing catalyst grains from passing. The gas evacuation means 84, and therefore the gas passage means 83, are distributed over the surface of the tray 81, for example in a uniform manner, and they make it possible to distribute the gas mixture in a uniform manner over the cross-section of the space 72 of the oxychlorination zone. The multiplication of the gas injection points by the means 84 on the cross-section of the reactor makes possible an excellent distribution of the gas mixture over the entire cross-section of the reactor, a distribution that can be faster than that relative to an intake in an external ring as presented by the document U.S. Pat. No. 7,985,381. For example, the gas evacuation means 84 can be placed in such a way that the distance that separates two means 84 is between 50 and 400 mm, preferably between 100 and 300 mm. Of course, the gas passage means 83 that are combined with the gas evacuation means 84 are positioned on the tray 81 with separate locations of the tubes 85.

The gas evacuation means 84 can consist of a grid, a device commonly named "bubble cap," or any other system allowing gas but not catalyst grains to pass.

For example, it is possible to use the "spike"-type gas evacuation means 84 shown in diagram form in FIG. 2. The gas injection means 84 consists of a cylinder 91 in a grid, for example a Johnson grid, covered by a solid sheet roof 92. The lower end of the cylinder 91 communicates with the gas passage means 83, while the upper end of the cylinder 91 is blocked by the plate 92 that forms a roof. The cylinder 91 preferably extends along a vertical axis to promote the flow of catalyst grains along the grid and to prevent the blocking and the deposition of fragments, also named "fines," of catalyst against the grid. The roof 92 can be cone-shaped so as to divert the flow of catalyst around the grid 91. For example, the diameter of the cylinders 91 can be between 0.5" (12.7 mm) and 5" (127 mm), preferably between 0.5" (12.7 mm) and 3" (76.2 mm), and the height of the cylinders 84 can be between 50 and 400 mm, preferably between 80 and 250 mm.

Figure 3:
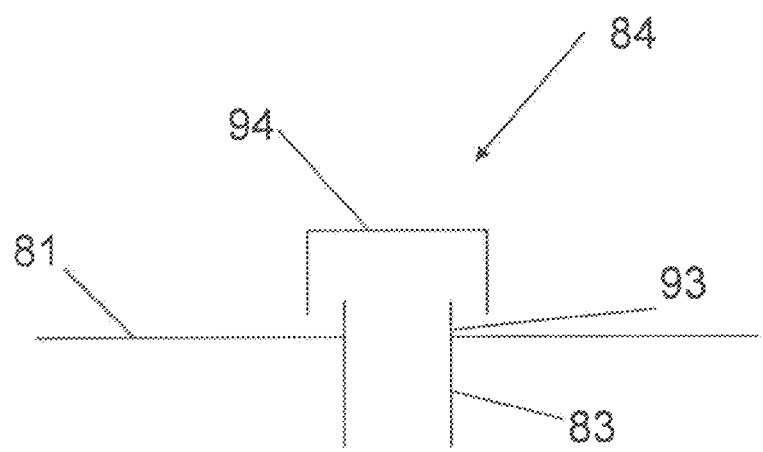
FIG. 3 shows in detail an embodiment of a gas evacuation means of the box according to the invention.

Alternatively, it is possible to use the gas injection means 84 of the "bubble cap" type that is shown in a diagram by FIG. 3. The references of FIG. 3 that are identical to those of FIG. 2 refer to the same elements. With reference to FIG. 3, the "bubble cap" opening consists of a vertical shaft 93 covered by a cap 94. The shaft 93 is a tube that passes through the tray 81 and that extends above the tray 81. The cap 94 can be dome-shaped, cone-shaped or cylindrical and covers at least the entire cross-section of the shaft 93. The cap 94 is arranged relative to the shaft 93 in such a way that the low end of the cap 94 is lower than the upper end of the shaft 93 so as to prevent catalyst grains from passing through the shaft 93. In addition, the cap 91 can reach the tray 81, with openings or gaps then being hollowed out at the ends of the cap so as to allow gas to pass.

The pipe 73 that passes through the chamber 2 makes it possible to introduce the oxychlorination gas into the inner space 86 of the box 80. The pipe 73 can be arranged to empty out into the middle of the inner space 86 of the box 80. For example, the pipe 73 can pass above, below or through the box 80. This configuration makes it possible to inject the oxychlorination gas into the middle of the box 80 so that it can be distributed in a homogeneous manner in the entire inner space 86.

According to another particular embodiment, the oxychlorination gas can also be injected into the wall of the chamber 2, directly into the space 86. Thus, the pipe 73 constitutes a lateral intake of gas into the space 86, i.e., the pipe 73 can pass through the chamber 2 essentially horizontally to empty into the space 86.

According to another particular embodiment, several pipes 73 can be used.

With reference to FIG. 2, the oxychlorination gas can exit from the pipe 73 directly when it returns into the space 86. Alternatively, the end of the pipe 73 that empties into the space 86 is equipped with a gas distributor to diffuse the gas in all directions in the inner space 86. For example, the distributor can be a vertical cylinder that is provided with openings or windows for diffusing the gas from the pipe into the inner space 86. Without exceeding the scope of this invention, it is also possible to use any type of distributor.

The operation of the mixing zone according to the invention is described with reference to FIG. 2. In FIG. 2, the space that is occupied by the catalyst is shown with crosshatching on the surface. The catalyst grains flow from the space 72 into the space 75 via the tubes 85 in the direction of the arrows 95. The calcination gas that circulates in the space 75 according to the arrows 96 comes into the mixing space 87. The oxychlorination gas is injected into the inner space 86 of the box 80 via the pipe 73. The oxychlorination gas flows from the inner space 86 into the mixing space 87 via the openings 89 of the tray along the arrows 98. Thus, the calcination gas that circulates according to an upward flow in the calcination space 75 is mixed with the oxychlorination gas that is injected via the openings 89 into the mixing space 87. Next, the gas mixture flows into the gas passage means 83 according to the arrows 98, and then it is evacuated by the gas evacuation means 84 according to the referenced arrows 97 into the oxychlorination space 72.

Thus, the box 80 that is combined with the tubes 85 extending under the box makes it possible to carry out a homogeneous mixing between the calcination gas with the oxychlorination gas, and the number of gas evacuation means 84 distributed over the cross-section of the reactor make it possible to distribute this gas mixture in a homogeneous manner over the entire cross-section of the oxychlorination zone.

The simplicity of the box 80 and the reduced dimensions of the box 80, in particular the small height requirement relative to the size of the reactor, make it possible to use the mixing zone according to the invention within the framework of a remodeling, commonly called "revamping," of an installation. Actually, it is possible to install the box 80 according to the invention that is equipped with an injection pipe 73 in place of another system in an existing reactor, for example a reactor that is described by the document U.S. Pat. No. 7,985, 381.

The entire disclosures of all applications, patents and publications, cited herein and of corresponding application number 12/02.107 FR, filed Jul. 25, 2012 are incorporated by reference herein.

The invention claimed is:

1. A reactor (1) enabling continuous regeneration of catalyst grains, comprising a chamber (2) that comprises an oxychlorination zone (72) superposed on a calcination zone (75) that is equipped with a calcination gas introduction pipe, a box (80) between the oxychlorination zone and the calcination zone, with the box (80) having an inner space (86) that is located between an upper tray (81) and a lower tray (82), with the upper tray (81) being gas-tight and sealed against catalyst grains, and with the lower tray (82) being provided with openings (89), the box (80) being separated by a height H from the calcination zone (75) by a mixing zone (87) that extends over said height H, a number of tubes (85) passing through the box, allowing the catalyst grain to pass from the oxychlorination zone into the calcination zone, with the tubes (85) extending over the height H of the mixing zone (87), a number of gas passages (83) passing through the box from the mixing zone to the oxychlorination zone, the reactor comprising at least one oxychlorination gas injection pipe (73) emptying into the inner space (86), each gas passage (83) comprising a gas evacuation device (84) in the oxychlorination zone, with the gas evacuation device being permeable to gas and impermeable to catalyst grains.

2. The reactor according to claim 1, wherein each gas evacuation device (84) is selected from among the group consisting of a bubble cap, a perforated plate, and a grid.

3. The reactor according to claim 2, wherein each gas evacuation device (84) is a vertical tubular grid, with the lower end of the tubular grid communicating with the mixing zone, and the upper end of the grid being blocked by a roof.

4. The reactor according to claim 3, wherein the roof is a cone whose peak is directed upward.

5. The reactor according to claim 1, wherein the oxychlorination gas injection pipe (73) empties into the middle of the inner space of the box.

6. The reactor according to claim 1, wherein the oxychlorination gas injection pipe (73) empties into the inner space of the box at the wall of the chamber of the reactor.

7. The reactor according to claim 1, wherein at least one part of the tubes (85) and gas passage (83) are integral with the two trays (81; 82).

8. A process for catalytic reforming of a hydrocarbon feedstock, comprising, in a reactor (1) for continuous regeneration of catalyst grains, comprising a chamber (2) that comprises an oxychlorination zone (72) superposed on a calcination zone (75) that is equipped with a pipe introducing calcination gas, a box (80) placed between the oxychlorination zone and the calcination zone, with the box (80) having an inner space (86) that is located between an upper tray (81) and a lower tray (82), with the upper tray (81) being gas-tight and sealed against catalyst grains, and with the lower tray (82) being provided with openings (89), the box (80) being separated by a height H from the calcination zone (75) by a mixing zone (87) that extends over said height H, a number of tubes (85) passing through the box, allowing the catalyst grain to pass from the oxychlorination zone into the calcination zone, with the tubes (85) extending over the height H of the mixing zone (87), a number of gas passages (83) passing through the box from the mixing zone to the oxychlorination zone, the reactor comprising at least one pipe (73) injecting oxychlorination gas emptying into the inner space (86), each gas passage (83) comprising a gas evacuation device (84) in the oxychlorination zone, with the gas evacuation device being permeable to gas and impermeable to catalyst grains, introducing a stream of catalyst grains at the top of the oxychlorination zone, introducing a stream of calcination gas via the pipe for introducing calcination gas, introducing a stream of oxychlorination gas via the pipe for injecting oxychlorination gas, introducing a stream of gas at the top of the oxychlorination zone, introducing a stream of catalyst grains is evacuated at the bottom of the calcination zone.

9. The process according to claim 8, wherein the catalyst grains comprise platinum that is deposited on a porous substrate, the calcination gas stream comprises air or depleted air and is at a temperature of between 400° C. and 550° C., and the oxychlorination gas stream comprises a chlorine-containing compound and is at a temperature of between 350° C. and 550° C.

10. A process for obtaining a reactor according to claim 1, comprising remodeling of an existing catalyst regeneration reactor by replacing an existing system injecting oxychlorination gas by said mixing zone (87).

* * * * *